United States Patent
Barber (10) Patent No.: US 6,915,433 B1
(45) Date of Patent: Jul. 5, 2005

(54) SECURELY EXTENSIBLE COMPONENT META-DATA

(75) Inventor: Christopher E. Barber, Jamaica Plain, MA (US)

(73) Assignee: Sumisho Computer Systems Corporation, Tokyo (JP)

(*) Notice: Subject to any disclaimer, the term of this patent is extended or adjusted under 35 U.S.C. 154(b) by 901 days.

(21) Appl. No.: 09/676,000

(22) Filed: Sep. 28, 2000

(51) Int. Cl.[7] .............................................. H04L 9/00
(52) U.S. Cl. ................................... 713/176; 713/161
(58) Field of Search ............................. 713/161, 165, 713/168, 175–181, 191, 200; 705/50–51, 59; 707/1, 3, 7, 9, 100, 200

(56) References Cited

U.S. PATENT DOCUMENTS

| | | | |
|---|---|---|---|
| 5,367,573 A | 11/1994 | Quimby | |
| 5,745,765 A | 4/1998 | Paseman | |
| 5,754,748 A | 5/1998 | Rivers et al. | |
| 5,765,176 A | 6/1998 | Bloomberg | |
| 5,931,947 A | 8/1999 | Burns et al. | |
| 5,950,001 A | 9/1999 | Hamilton et al. | |
| 5,963,953 A | 10/1999 | Cram et al. | |
| 6,084,965 A | 7/2000 | Ahn et al. | |
| 6,249,866 B1 * | 6/2001 | Brundrett et al. | 713/165 |
| 6,278,791 B1 | 8/2001 | Honsinger et al. | |
| 6,549,957 B1 | 4/2003 | Hanson et al. | |

OTHER PUBLICATIONS

"CALICO COMMERCE: Calico launches advance interactive selling configuration software: Network Advisor enables component–based modeling for rapid configuration of highly complex products and services," *M2Presswire* (Aug. 2001).

* cited by examiner

*Primary Examiner*—Hosuk Song
(74) *Attorney, Agent, or Firm*—Finnegan, Henderson, Farabow, Garrett & Dunner, L.L.P.

(57) ABSTRACT

Methods and apparatus are provided for associating meta-data with digital components and for updating the meta-data with meta-data supplements. Security provisions are included to ensure unauthorized updates are not permitted.

4 Claims, 3 Drawing Sheets

SECURELY EXTENSIBLE COMPONENT META-DATA

FIELD OF THE INVENTION

The present invention relates generally to methods and apparatus for providing meta-data for digital components and more particularly to methods and apparatus for providing securely extensible meta-data for components of digital content.

BACKGROUND OF THE INVENTION

In the past, computers generally operated on files of relatively simple data, such as a program object file or a data file containing ASCII text. Now computers operate on complex systems of interrelated components. For example, a program may comprise dozens of modules that are dynamically loaded and released as needed. Whereas a document, such as a web page, may be composed of multiple interrelated files, including text, images, audio, video, links to other documents, and executable routines.

To better cope with the explosion in complexity, many developers employ component-based development techniques. Using these techniques, complex systems can be constructed by combining simpler, robust components. For example, a web page may be composed of a template component that defines the basic look and feel of the web site as a whole, combined with a text component that specifies the textual content to be laid out according to the template.

Generally, components are units of code or content that are independently deployable, and that may be used with other components to build systems, such as software applications and digital content. Components may also be used to build other components. A component should be well-separated from its environment and from other components, should be self-contained, and should have a well-defined interface. The interface of a software component typically includes definitions of the publically accessible features of the component, such as functions, classes, or global variables. These portions of the external interface are referred to as the functional or programmatic interface of the software component because they define how the software component functions. Because the interface determines how a component may be invoked, a component based system may allow multiple component implementations to express the same interface.

In addition to the functional aspects of a component specified in the component interface, components often have nonfunctional attributes as well. For example, the name of the programmer that created a software component, it's revision history, known bugs, a copyright notice, and a vendor identifier, are nonfunctional attributes of a component. As used herein, such nonfunctional or informational component attributes are referred to as meta-data.

Although some component systems, such as those provided by the Java™ programming language, permit meta-data such as a vendor name or a version number to be associated with a component, the meta-data is often limited to a fixed set and typically cannot be extended. Other systems, such as the Component Object Model (COM) architecture, by Microsoft Corporation of Richmond, Washington do not provide a mechanism for associating arbitrary meta-data with a component. It would therefore be desirable to provide a mechanism for associating arbitrary meta-data with digital components.

However, statically associating arbitrary meta-data with a digital component may not be sufficient in a complex system incorporating many components. In some instances, it may be important to be able to add, delete, or update meta-data associated with a component. Meta-data associated with a component may include information that is apt to change over time, such as information identifying a web site or telephone number that may be used to obtain technical support about proper use of the component. Or, interface specifications may become deprecated or altered. It would therefore be desirable to provide a mechanism for modifying component meta-data.

In addition to information such as providing vendor identification, references to technical support, and the like, meta-data may also be used to indicate that a component complies with a relevant standard or meets certain safety requirements. For example, a third party certification organization may add a meta-data element to a component indicating that the component complies with the POSIX specification or that the manufacturer is ISO 9000 certified. Such meta-data may only be relied upon if it is secure from tampering and alteration. However, such meta-data may need to be changed or revoked, if, for example, an area of non-compliance were found after the original certification was given. It would therefore be desirable to provide methods for securing meta-data against tampering while providing for authorized changes to the meta-data.

SUMMARY OF THE INVENTION

It is, therefore, an object of the invention to provide methods and apparatus for associating arbitrary meta-data with digital components.

It is also an object of the invention to provide methods and apparatus for modifying component meta-data.

In addition, it is an object of the invention to provide methods and apparatus for securing meta-data against tampering while providing for authorized changes to the meta-data.

These and other objects and advantages of the present invention are provided by a meta-data structure and system comprising local meta-data associated with a component. Meta-data supplements provide a mechanism for extending or changing the local meta-data. Digital signatures associated with the component, the meta-data, and the supplements may be used to authenticate the supplements and authorize updates to component meta-data.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which.

DETAILED DESCRIPTION OF THE INVENTION

In accordance with the principles of the present invention, complex systems of digital content may be constructed using one or more components. As used herein, a component is an independent content unit that may be used by, imported into, or combined with other content units. Components preferably have well-defined interfaces, so that components may be interconnected, without requiring detailed knowledge of their inner workings.

Although the examples of components used herein generally involve software components, referred to as "packages," that contain software routines or objects that perform various functions, the present invention is applicable to other types of components as well. For example, a component may contain an interface definition, a document, images, music, video, spreadsheets, or other information that can be stored digitally. A component typically encapsulates a collection of related data or functionality, and may comprise one or more files.

A program or other object that uses components is said to "import" the components that it uses. Various mechanism are used to import a component when building a larger system. For example, in a C++ language program, interface definitions are imported using the "#include" directive; whereas, parameters passed to a linker may be used to indicate which run time libraries should be imported, or "linked," into the executable program. Alternatively, development tools such as integrated development environments (IDEs) may provide configuration settings or dialogs for specifying components to be imported.

A component that is loaded and ready for use is said to be "bound" to the object that loaded it, and the process of loading the component and linking it to the program or other object that uses it is referred to as "binding." It will be understood by one skilled in the art that binding may be performed either when a component is built, when the content is loaded by an operating system, or on demand when the imported component is needed by another component.

Figure 1:
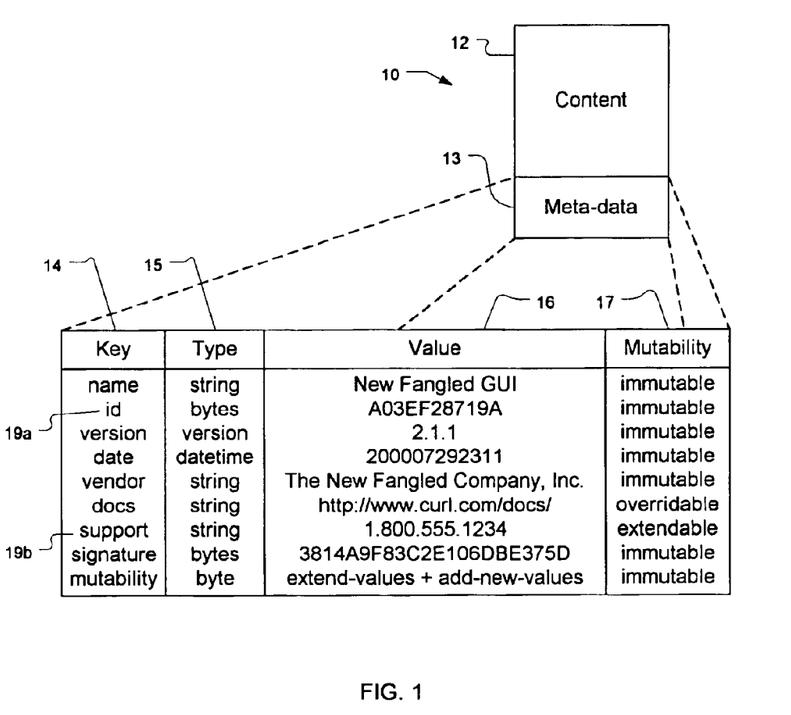
FIG. 1 is a schematic representation of a component, showing illustrative meta-data associated with the component.

Referring now to FIG. 1, the structure of illustrative component 10, constructed in accordance with the principles of the present invention, is described. Component comprises content 12, which may include code or other data, and meta-data 13, which may include a variety of information about component 10. The information included in meta-data 13 should minimally include a unique component identifier and will also typically include a component name. Meta-data 13 may also include a variety of other information, as described in detail herein. Parts of meta-data 13 may be specified by a programmer or content developer during content development, while other parts may be computed and added to meta-data 13 by development tools. For example, a unique ID assigned to a component may be computed by using a secure hash function, as described in co-pending, commonly owned U.S. patent application No. 09/676,415, filed Sep. 28, 2000, and entitled "Methods and Apparatus for Generating Unique Identifiers for Software Components." Similarly, the time at which component 10 was built or released would be computed and added to meta-data 13 by a build or release tool.

As shown in the inset, meta-data 13 comprises a series of meta-data elements, each including a key field, type field, value field, and mutability field. Key field 14 assigns names to each meta-data element. For example, a meta-data element for a unique component identifier may have a key field of "uid," while a meta-data item containing the name of the component author may have "author" in the key field.

Type field 15 specifies the data type of the value field. To simplify reading, processing, and interpreting the meta-data, meta-data types are preferably restricted to a small set of fundamental data types. A preferred set of meta-data types includes bytes, characters, floating point numbers, integers, and strings. Arrays or sequences of the fundamental meta-data types are also to be supported. Other data types may include time stamp, digital signature, and structured version number (e.g., 2.1.1). Note that arbitrary types may be simulated using arrays or strings of characters. Value field 16 contains data, of the appropriate type, associated with the corresponding key.

Mutability field 17 indicates if, and under what circumstances, modification of a meta-data element is permitted. Meta-data mutability field 17 may be either an enumerated type, or a collection of Boolean flags indicating restrictions on the mutability of the meta-data element. Values for meta-data mutability field 17 may include values corresponding to 'immutable,' 'overridable,' 'extendible,' and 'insecurely-extendable.'

An immutable meta-data element is one having a value that cannot be modified after an initial value has been set. Whereas an overridable meta-data element is one in which the value of the meta-data element may be overridden by a value in a subsequent meta-data supplement as described below. For example, "uid" meta-data element 19a should not be modified once it has been assigned, but a "support" meta-data element 19b, containing a customer support telephone number, may be overridden to accommodate changes to the telephone number.

Extendable and insecurely-extendable meta-data elements may have additional values added, or appended, to previous values of the meta-data element. The difference being the level of security needed to extend the meta-data value. For example, "support" meta-data element 19b may be extended to include additional telephone numbers or a web site address. Whether security precautions must be taken when extending support meta-data element 19b is determined by the component author or vendor and specified in mutability field 17.

Additional fields may also be included in a meta-data element depending on the application. The fields may have fixed or variable lengths and may be encoded using a variety of methods. For example, a meta-data element containing confidential information may have an encrypted value, and an additional field may be used to indicate whether the value is encrypted.

In a preferred embodiment of the present invention, meta-data 13 includes a standard set of meta-data elements such as those listed in table 1. It will be understood that the meta-data associated with a component may vary, and that some systems will include additional meta-data in the standard set of meta-data. It will also be understood that some of the meta-data items listed in Table 1, such as the name of

TABLE 1

| Meta-data Key | Description |
| --- | --- |
| name | The name of the component. |
| id | Unique ID for the component. |
| meta-data-mutability | Indicates whether the meta-data is mutable. |

TABLE 1-continued

| Meta-data Key | Description |
| --- | --- |
| time-stamp | The time at which the instance of the component was created. |
| component-signatures | One or more signatures based on the component excluding the meta-data. |
| meta-data-signatures | One or more signatures based on the content of the local meta-data excluding the meta-data-signature element itself. | the component, may be stored separately from other meta-data to improve efficiency, due to the frequency with which the meta-data items are accessed. Certain of the meta-data keys listed in Table 1, such as "name", will be given values by a programmer or content developer, while others, such as "compilation-time" and "id" will be generated by a compiler, linker, development environment, or release tool.

As indicated in Table 1, the name and id meta-data elements identify a specific component, and the time-stamp indicates when the component was created or released. The "meta-data-mutability" element consists of a set of boolean flags that indicates whether and in what manner the component meta-data may be overridden or extended by the mechanism described below. In a preferred embodiment of the invention, the flags include "override-values," "extend-values", "insecurely-extend-values," add-new-standard-values," and "add-new-nonstandard-values."

The override-values flag determines whether 'overridable' meta-data elements are allowed to be overridden. The extend-values flag indicates whether 'extendible' and 'insecurely-extendible' meta-data elements may be extended. Previously unspecified standard meta-data elements may be added with all except 'insecurely-extendible' elements when the add-new-standard-values flag is set. The add-new-non-standard-values flag allows previously unspecified non-standard meta-data elements to be added with all elements, including 'insecurely-extendible' values. Operations permitted by appropriate settings of the foregoing flags are subject to authentication and authorization as described below. On the contrary, the insecurely-extend-values flag allows 'insecurely-extendible' meta-data elements to be extended without requiring authentication. Preferably, the flags are all false by default.

The meta-data elements listed in Table 1 comprise a standard set of meta-data elements that should be present in all components. However, in accordance with the principles of the present invention, meta-data associated with a component may include an essentially arbitrary set of meta-data elements, such as the exemplary meta-data elements listed in Table 2. One skilled in the art will understand that the meta-data elements listed in Tables 1 and 2 are by no means exhaustive; rather, they are merely suggestive of the types of information that may be recorded in meta-data elements.

The "standard" and "non-standard" meta-data elements differ in that the standard elements have a predefined meaning within a given software component

TABLE 2

| Meta-data Key | Description |
| --- | --- |
| documentation | A pointer to support information, such as documentation about the component. |
| licensing | Licensing information. |

TABLE 2-continued

| Meta-data Key | Description |
| --- | --- |
| localization | Specifies information used to adapt the component to differing locales. |
| optimization | Indicates whether and how a component is optimized, e.g., for space or execution speed. |
| platform | Indicates the platform(s) on which the component may be used. |
| product-id | A vendor supplied product identifier |
| supplement-signature | One or more signatures based on the content of the supplement, excluding the supplement-signature itself. |
| support | Telephone numbers, e-mail addresses, web sites where customer support may be obtained. |
| requires | A list of other components that this component needs to be able to function properly. |
| vendor-id | A unique identifier for a vendor. |
| vendor-name | A text string with the name of the vendor. |
| version | A version number. | architecture and have defined type signatures and mutability attributes. For instance, the standard "time-stamp" element must always have a type appropriate for containing date time data and will also be immutable. When any instance of a standard meta-data element having an inappropriate data type or mutability attribute is encountered, the system may produce errors. Non-standard meta-data elements, on the other hand, do not have predefined meanings, data types, or mutability settings. Indeed, different components may use the same non-standard meta-data in different and incompatible ways. Preferably, a component architecture specifies a naming convention to distinguish between standard and non-standard meta-data elements. Such a convention might even be automatically enforced by the system.

Some of the meta-data elements in Tables 1 and 2 are digital signatures. As such they are designed to be tamper proof elements that may be used to authenticate, or validate, the corresponding component, meta-data, or meta-data supplement. One method of signing data involves applying a known cryptographic digesting algorithm to the content being signed to obtain a digest or hash of the content. The digest is then encrypted using a private key of a signing party to produce a digital signature.

Another party may then authenticate the signature by computing the digest of the content using the same algorithm used by the signing party and comparing the results to the result of decrypting the signature with the public key of the signing party. *Applied Cryptography, Second Edition: Protocols, Algorithms, and Source Code in C*, by Bruce Schneier, published by John Wiley & Sons, Inc. in 1996, which is incorporated herein, provides additional information on the use and implementation of digital signatures.

Figure 2:
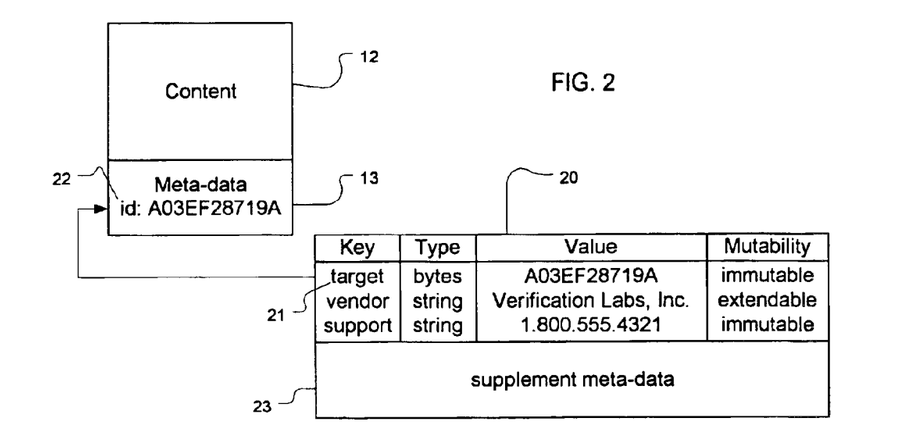
FIG. 2 is a schematic representation of a component and a meta-data supplement in accordance with the principles of the present invention.

Meta-data 13, which is preferably embedded within component 10, is referred to as local meta-data or component meta-data. Local meta-data is fully determined when the component is built and may not be changed thereafter. Additional meta-data may be associated with a component using meta-data supplements as shown in FIG. 2.

Meta-data supplement is a special type of component in which content 12 contains meta-data elements 21 that extend, modify, or override meta-data 13 of a specified component referred to as the target component. Meta-data in meta-data supplement 20 relating to the target component is referred to as target meta-data. Because a meta-data supplement is itself a component, it has its own meta-data, including the standard meta-data elements, as well as other meta-data elements such as a timestamp and possibly a signature. This supplement meta-data applies to the supplement itself, whereas the target meta-data applies to the target component.

As shown, meta-data supplement 20 includes target meta-data element 21 identifying the target component of the meta-data supplement. The value of the target meta-data element is a unique identifier for a component and may be a string, such as a filename or a Universal Resource Locator (URL), or a suitable unique id number. As an example, target meta-data element 21 of FIG. 2 has a value of "A03EF28719A," corresponding to the value of id meta-data element 22 of component 10 Therefore, component 10 is the target of the meta-data supplement.

Figure 3:
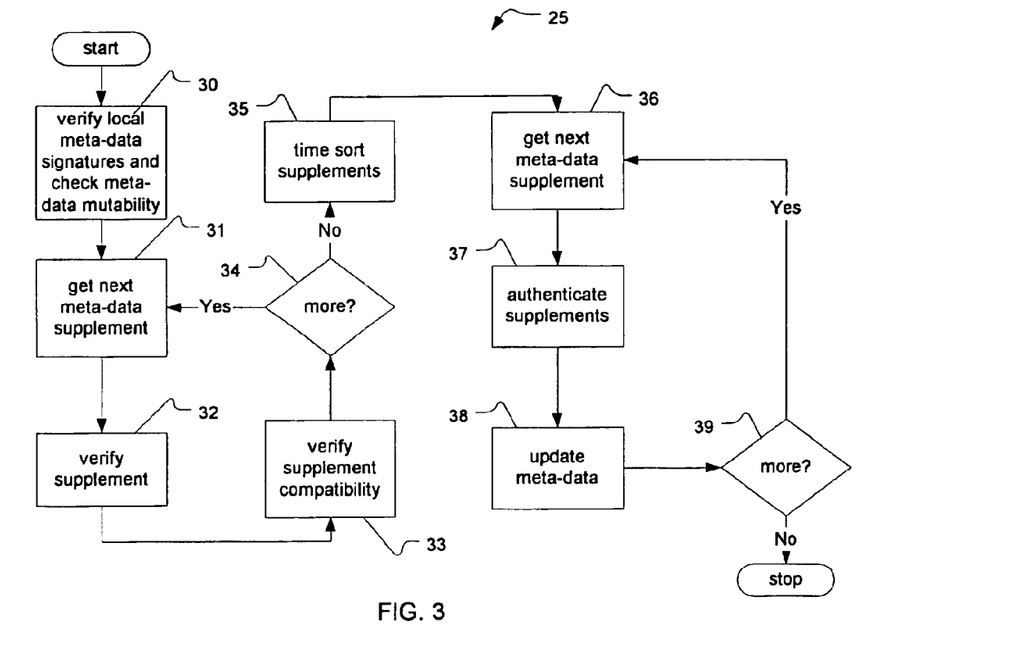
FIG. 3 is an illustrative flow chart of a process for finding meta-data associated with a component.

Referring now to FIG. 3, a procedure for applying a meta-data supplement to meta-data associated with a component is now described. Procedure 25 begins by initializing a current set of meta-data to the meta-data associated with a target. Any signatures associated with the current meta-data are authenticated, or verified, at 30 as described above. A signature that fails verification may have been corrupted or tampered with and should be dropped from the current meta-data.

At 30, the meta-data-mutability attribute of the current meta-data is checked. If the value of the meta-data-mutability element precludes modification of the meta-data, then the procedure is terminated. The procedure is also terminated unless at least one signature is successfully authenticated, or there is at least one meta-data element that is insecurely-extendable. Otherwise, meta-data supplements may be applied to the current meta-data.

At 31, a meta-data supplement applicable to the target component being updated is located and retrieved. This may be done by looking for meta-data supplements in specified locations on the local computer or across a network to a component repository. Details of locating components based on its meta-data, e.g., the target-id meta-data, are more fully described in commonly owned U.S. patent application No. 09/678,178, filed Sep. 28, 2000, and entitled "CONSTRAINT-BASED LOCATION AND BINDING OF SOFTWARE COMPONENTS," which is incorporated herein in its entirety.

A meta-data supplement is verified, at 32, by authenticating any signatures associated with the supplement. Signatures that fail authentication are dropped. Then, compatibility between the current meta-data and target meta-data is checked, at 33. Component and target meta-data are compatible when (1) standard meta-data elements are present and have the proper data type and mutability attributes, (2) target meta-data elements have data types and mutability attributes that are compatible with corresponding meta-data element in the current meta-data, if such elements exists, and (3) no elements have a mutability attribute of 'immutable'.

After all meta-data supplements have been processed, at 34, they are sorted, at 35, according to their time stamp. This is done so that earlier released meta-data supplements are applied before later meta-data supplements.

Then, the earliest timestamped supplement is applied to the current meta-data, at 36. First, at 37, the meta-data supplement is checked to see if it is authorized to modify the current meta-data. Various schemes may be used to determine whether a meta-data supplement is authorized. In a simple scheme, a meta-data supplement may be authorized if it is signed by a signer that is recognized as being trustworthy, e.g., the signer is on a list of trusted signers. A more complex system may authorize a supplement if there is at least one common signer between the target meta-data and the current meta-data. That is, there are signatures associated with both the current and supplemental meta-data that may be decrypted using the same public key. Clearly, other authorization schemes may also be used with the present invention. Unauthorized supplements are discarded if the target meta-data is not insecurely extendible. Any remaining meta-data supplements are applied to the current meta-data at 38.

Elements of the current meta-data are updated according to their mutability attributes. Supplemental meta-data elements cannot be immutable, otherwise, the supplement would have been discarded at step 33 for being incompatible. The value of an overridable meta-data element is replaced provided that the supplement was authenticated, and the override-values flag has been set in the component's meta-data-mutability. Extendable supplemental meta-data elements are appended to, or concatenated with, the value of corresponding elements in the current meta-data, provided that the supplement was authenticated, and the 'extend-values' flag of the component's meta-data-mutability attribute has been set. Similarly, for insecurely extendable elements, the 'insecurely-extend-values' flag of the component's meta-data-mutability attribute must be set. In each case, if there is no corresponding meta-data element already in the current set, the supplemental meta-data element may only be added to the current meta-data if the add-new-values flag is set. If the appropriate flag is not set, the element will be ignored; alternatively implementations may reject the entire supplement if this occurs.

The process just described provides a generic method for updating meta-data associated with a component by applying one or more meta-data supplements. However, the form described may not be the most efficient for many applications. It is anticipated that a likely scenario involves a networked environment in which components may be imported or deployed on remote computers. In such a scenario the components may be stored in one or more component repositories connected to the network. When a component is needed, it may be retrieved from a repository. To improve efficiency, up-to-date component meta-data is preferably maintained by the repository.

Figure 4:
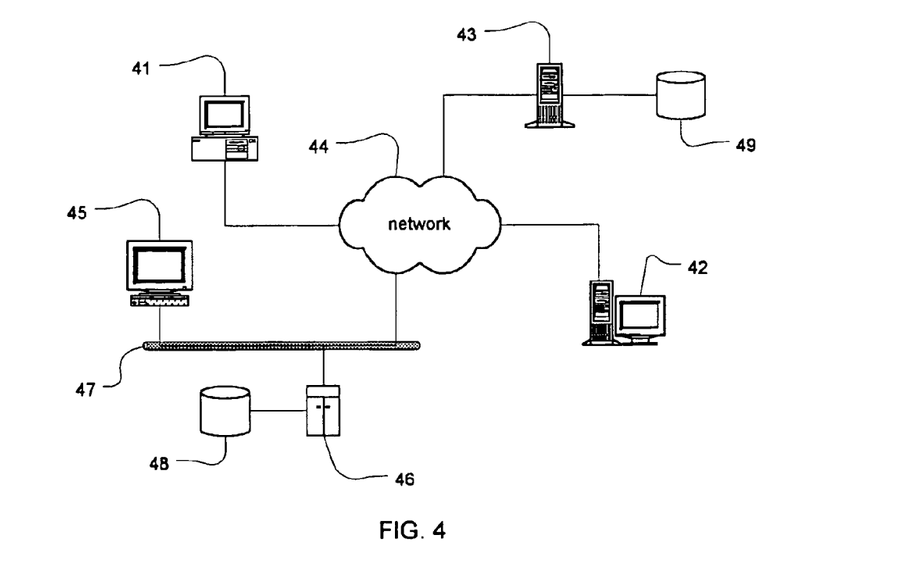
FIG. 4 is a simplified diagram of an exemplary system in which the principles of the present invention may prove useful.

A simplified schematic representation of a network is shown in FIG. 4, including computers 41 and 42, and server 43, interconnected by wide area network 44, e.g., the Internet. Computer 45 and server 46 are also connected to network 44 via local area network 47. Well known protocols, such as TCP/IP, and HTTP, coupled with naming schemes, such as the Uniform Resource Identifier (URI) developed for use on the World Wide Web ("Web"), enable data and information to be exchanged between the computers and servers. Components stored in component repositories 48 and 49 may then be accessed or imported by components located elsewhere in the network. So that, for example, an application program executing on computer 41 may import a spreadsheet component from component repository 48 and a data visualization component from component repository 49.

Figure 5:
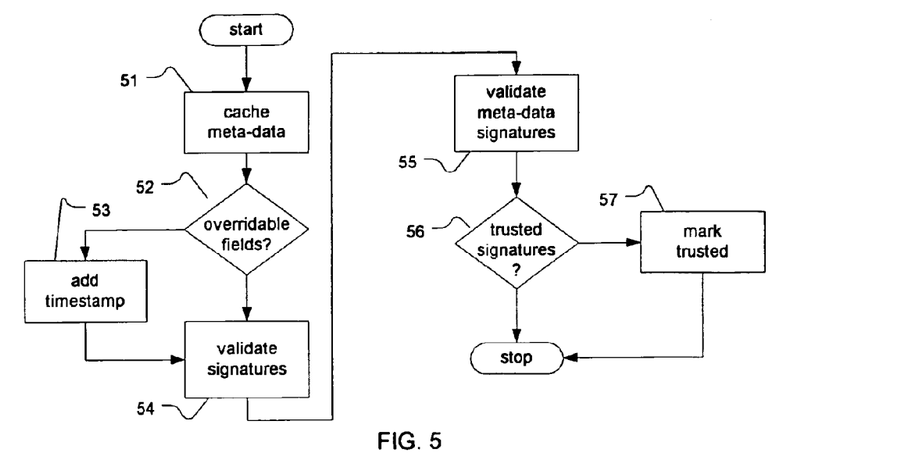
FIG. 5 is an illustrative flowchart for adding a component to a component repository.

In such a network environment, the process shown in FIG. 3 may be performed as part of typical component repository operations, such as adding or removing a new component, meta-data supplement, or trusted signer. FIG. 5, is a flow chart for adding a new component to a component repository in accordance with the principles of the present invention. Note, that only those process steps relevant to the processing of component meta-data are shown or discussed, other unrelated steps may also be performed when a component is added to a repository.

When a new component is added, any meta-data associated with the component is extracted and cached in the repository, at step 51, so that it may be easily and quickly retrieved without having to extract it from the component itself This is done to improve efficiency of other operations performed on components in the repository. For example, some components may be too large to store in the repository, in which case, the repository may contain a pointer to the component, such as a Uniform Resource Locator ("URL"). By caching the component's meta-data in the repository, the meta-data may be accessed without having to access and process the component. Each cached overridable meta-data elements should marked with the timestamp of the underlying component, as shown at steps 52 and 53.

Component signatures in the meta-data component being added are then validated at step 54. As described above, validating a signature requires access to a signing party's public key. If a signing party's public key for a meta-data signature cannot be found, then the corresponding signature should be marked as not validated. A signature that has not been validated may be validated at a later time when a public key is found. However, if a public key is found and the signature fails to be validated then the signature is removed from the meta-data. Meta-data signatures are validated in an analogous manner, at 55. These steps correspond to step 30 of the flowchart in FIG. 3.

Signatures that have been validated may then be checked against a list of trusted signatories kept by the repository, at 56. Components that are signed by at least one trusted signatory are marked as trusted components, at 57. Alternative schemes may also be used wherein components may be assigned different levels of trust based, for example, on the highest level of trust of any component signatory, or on the number of trusted signatories. Components without any trusted signatories may be removed from the repository, or simply marked as untrusted, depending on the security policy objectives of the repository.

Optionally, additional meta-data elements may be added to the component meta-data cached by the repository to provide other useful information. For instance, meta-data elements containing the date and time a component was added to a repository may be added to the cached meta-data.

Figure 6:
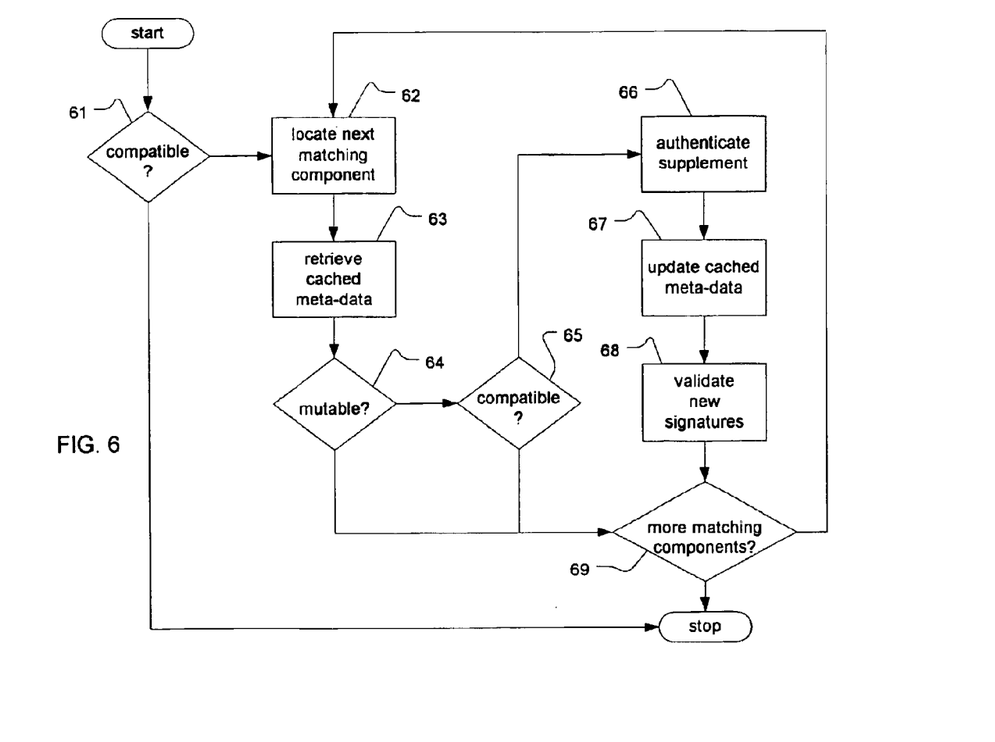
FIG. 6 is a flowchart of an illustrative procedure for adding a meta-data supplement to a repository.

A flow chart of a corresponding process for adding a meta-data supplement to a repository is shown in FIG. 6. First, at 61, the meta-data supplement is analyzed to determine if it is compatible with the standard meta-data elements as described above in connection with step 33 of FIG. 3. An incompatible meta-data supplement is discarded.

Then the repository is searched, at 62, to locate target components determined by the target meta-data element of the meta-data supplement. Multiple components may be found, for example, when the repository includes multiple versions of the same component in different delivery formats or with different optimizations. For each component found in the repository, the meta-data is updated as described below.

The cached meta-data for the target component is retrieved, at step 63, and its meta-data-mutability attribute checked as in step 30 of FIG. 3, at 64. If the attribute does not allow for changes, then processing of the current component is skipped. Otherwise, at step 65 compatibility of the target meta-data with the current state of the cached meta-data is verified as described with reference to step 33 of FIG. 3. If the supplement is not compatible then no further processing of the meta-data supplement for the current component is required.

At step 66, the supplement is authorized against the component and applied to the cached meta-data as described above with regard to steps 37 and 38 of FIG. 3. In updating overridable meta-data elements, at 67, the value of existing meta-data element having timestamps later then the timestamp of the meta-data supplement are not updated. And, if an overridable element is updated, the timestamp of the overridable element value is set to the timestamp of the meta-data supplement.

Lastly, if any new signatures were added to the cached meta-data by the supplement, the new signatures are validated, at 68, and marked or dropped as described above in connection with FIG. 3. In addition, the component may need to be marked as trusted if the new signatory is on the list of trusted signatories.

The remaining repository operations are handled as follows. When a new trusted signatory is added to the list of signatories trusted by the repository, each component marked as untrusted must be examined to see if it was signed by the new trusted signatory. If a trusted signer is removed, then all components in the repository must be reexamined to determine if it is still signed by a trusted signatory. The components are then re-marked as trusted or untrusted as appropriate.

If so, the component may then be marked as trusted. Removing a component also results in the removal of any meta-data supplements associated with that component, unless of course, the meta-data supplement still applies to other components still in the repository. Removing a meta-data supplement is a potentially expensive operation, because the meta-data associated with any component affected by the supplement must be computed from scratch, by for example, removing the components and supplements from the repository and re-adding them to the repository as described above. As an alternative to removing a supplement, it may be possible to add a new supplement overriding the meta-data elements to be removed.

While preferred illustrative embodiments of the present invention are described above, it will be evident to one skilled in the art that various changes and modifications may be made without departing from the invention. It is intended in the appended claims to cover all such changes and modifications which fall within the true spirit and scope of the invention.

What is claimed is:

1. A computer-implemented method of updating meta-data associated with a component, wherein the meta-data includes a plurality of meta-data elements, the method comprising:

verifying signatures associated with the component meta-data;

accepting a first meta-data supplement comprising a plurality of meta-data elements;

verifying signatures associated with the first meta-data supplement;

authenticating the first meta-data supplement; and updating the meta-data elements associated with the component with values of the plurality of meta-data elements associated with the first meta-data supplement;

accepting a second meta-data supplement comprising a second plurality of meta-data elements;

verifying signatures associated with the second meta-data supplement;

authenticating the second meta-data supplement;

sorting the first and second meta-data supplements to provide a sorted plurality of meta-data supplements, each meta-data supplement including a time stamp and sorting the first and second meta-data supplements comprising sorting the meta-data supplements according to the time stamps;

updating the meta-data associated with the component with values of corresponding meta-data elements from the sorted meta-data supplements; and verifying, by a computer, compatibility between meta-data associated with a component and a meta-data supplement by determining that like-named meta-data elements associated with the component and the meta-data supplement have compatible types and compatible mutability attributes.

2. A computer-implemented method for use with digital components, the method comprising:

accepting a digital component the digital component comprising content and component meta-data;

accepting a first meta-data supplement, the first meta-data supplement comprising first target meta-data and first supplement meta-data;

updating the component meta-data with the first target meta-data;

determining whether the component meta-data is mutable; and determining whether the target meta-data is compatible with the component meta-data, wherein the component meta-data and target meta-data each comprise a plurality of meta-data elements having an associated name, type, value, and mutability attribute, and wherein determining whether the target meta-data is compatible with the component meta-data comprises performance of the following by a computer:

selecting a first meta-data element from the target meta-data;

determining whether the component meta-data includes a like-named meta-data element;

determining whether the first meta-data element and the like-named meta-data element have compatible mutability attributes; and determining whether the first meta-data element and the like-named meta-data element have compatible types.

3. The method of claim 2 wherein the component meta-data includes a first meta-data signature and the target meta-data includes a second meta-data signature, the method further comprising:

verifying the first and second meta-data signatures; and updating the component meta-data with the first target meta-data only if the meta-data signature are successfully verified and the first and second meta-data signatures are from the same signer.

4. The method of claim 3 wherein the first and second meta-data signatures comprising digital signatures using public key cryptography.

* * * * *

UNITED STATES PATENT AND TRADEMARK OFFICE
CERTIFICATE OF CORRECTION

PATENT NO. : 6,915,433 B1
DATED : July 5, 2005
INVENTOR(S) : Barber

It is certified that error appears in the above-identified patent and that said Letters Patent is hereby corrected as shown below:

Column 11,
Line 9, "component the" should read -- component, the --.

Column 12,
Line 19, "signature" should read -- signatures --.
Line 23, "comprising" should read -- comprise --.

Signed and Sealed this

Sixth Day of September, 2005

JON W. DUDAS
*Director of the United States Patent and Trademark Office*